Patented Feb. 26, 1952

2,587,210

UNITED STATES PATENT OFFICE 2,587,210

PRODUCTION OF ACRYLAMIDES

Benjamin Phillips and Paul S. Starcher, Charleston, W. Va., assignors, by mesne assignments, to Union Carbide and Carbon Corporation, a corporation of New York No Drawing. Application August 1, 1949, Serial No. 108,048

10 Claims. (Cl. 260—561)

This invention relates to acrylamides. It is more particularly concerned with an improved process for producing them by catalytic vapor phase de-alcoholation of beta-(lower alkoxy) propionamides.

Acrylamide and alpha-alkylacrylamides are of considerable importance for production of synthetic resins. Copolymerized with other monothetic resins, acrylamide contributes valuable properties to a resin. A number of methods have been suggested for making acrylamide and its homologs. For instance, it has been proposed to react ammonia and amines with acrylyl chloride or with beta-chlorpropionyl chloride, followed by dehydrochlorination, or with beta-propiolactone followed by dehydration. None of these suggestions seems to have been found commercially attractive, however. In a few special cases, such as have been reported, N-(orthotolyl) acrylamide was made by the cracking of dimethylamine from beta-dimethylamino N-(orthotolyl) acrylamide, and N,N-dimethylacrylamide by pyrolysis of N,N-dimethylalpha-acetoxypropionamide.

It is known that at elevated temperatures certain materials act on alkoxypropionic acid and alkoxypropionic ester to give acrylic acid or acrylic ester, as the case may be. The materials suggested for this purpose include sulfuric acid, phosphoric acid, potassium hydroxide, barium hydroxide, sodium methoxide, and possibly others. It is known also that at elevated temperatures acrylamide is readily dehydrated to acrylonitrile and for this purpose the use of such materials as manganous oxide and fused pyrolusite has been proposed.

The present invention is based on our discovery that beta-(lower alkoxy) aliphatic acid amides may be de-alcoholated in the vapor phase over lithium phosphate or titania as a catalyst, without concurrent dehydration of the amide to the corresponding nitrile or excessive polymerization of the product. The reaction which takes place is illustrated by the following equation

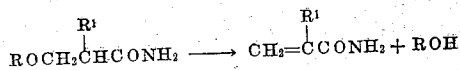

in which R is a lower alkyl group and R¹ is hydrogen or a lower alkyl group. By "lower alkyl group" is meant a saturated hydrocarbon radical, composed of carbon and hydrogen, and containing not more than eight carbon atoms. Alkoxy propionamides and alpha-alkyl alkoxy propionamides in which the alkyl groups are methyl, ethyl, propyl or butyl are preferred.

In carrying out the reaction, the alkoxyamide, in the vapor phase, is passed over the lithium phosphate or titania contained in a converter maintained at a suitable reaction temperature. The vapors issuing from the converter are collected by cooling and condensation. The acrylamide can be isolated from the condensate by expedients which, in themselves, are well known, as by distillation, crystallization and the like.

The catalyst can be in the form of granules or pellets composed entirely or substantially entirely of lithium phosphate or titania. If desired, the lithium phosphate or titania can be supported on a catalyst carrier, as, for instance, silica, impregnated with lithium phosphate or titania.

The converter can be a length of stainless steel tube containing the catalyst. If desired, the inlet end of the tube can be packed with catalytically inert material, for instance, catalytically inert silica, to serve as a preheater and vaporizer for the material.

The catalyst bed should be held at a temperature between 250° and 500° C., the particular temperature within this range being a matter of choice dependent upon a number of factors, including the desired conversion and the rate of flow of the vapors through the converter. At temperatures below 250° C. in the case of lithium phosphate and 225° C. in the case of titania the catalyst exhibits low activity. At temperatures above 500° C. using lithium phosphate and 400° C. using titania, extensive thermal polymerization of the product has been observed, with consequent fouling of the catalyst surface and rapid loss of catalyst activity. Temperatures of about 325° to 425° C. are preferred with lithium phosphate as catalyst and 250° to 350° C. with titania as catalyst.

We have found it convenient to use a diluent in carrying out the reaction. It serves to decrease the amount of polymerization occurring in the catalyst chamber, probably by keeping the unsaturated molecules apart. Although any gas or vapor, inert in the reaction, can be used as a diluent, for instance nitrogen, we prefer to use the vapor of a low boiling liquid, such as water or an alkanol because these liquids have the additional advantage of being solvents for the starting material and the reaction product which, in most cases, are crystalline solids.

The presence of a polymerization inhibitor during the reaction is advisable, although not necessary. By way of illustration, we have found that the addition of a small amount of N-phenyl-beta-naphthylamine to the starting material reduces the amount of polymerization which takes place at that stage where product issuing from the converter has been condensed but is still hot. If the acrylamide product is to be isolated by distillation, an inhibitor should be present during this purification step also, to prevent polymerization in the still kettle. By way of illustration, N,N'-di-(beta-naphthyl) paraphenylenediamine is particularly effective for this purpose.

The following examples are illustrative:

Example 1

A mixture of 605 parts of beta-methoxypropionamide, 302 parts of methanol and 2 parts of N-phenyl-beta-naphthylamine was passed over lithium phosphate as catalyst maintained at a temperature of 365° C. The lithium phosphate catalyst was in the form of granules or particles from 4 to 6 mesh in size, having a total volume of 300 milliliters, and contained in a converter which was a stainless steel tube of 1 inch inside diameter. The inlet end of the converter tube was packed with about 100 milliliters of catalytically inert silica to serve as a preheater and vaporizer for the mixture. The mixture was introduced into the preheater and vaporizer at the rate of 200 milliliters per hour. The reaction products from the converter were collected by cooling and condensation, and inhibited against polymerization by the addition of 2 parts of di-betanaphthyl - paraphenylenediamine. The condensate was then distilled under reduced pressure using a two-foot unpacked column for fractionation. A fraction distilling at 93° to 112° C. at a pressure of 3 millimeters of mercury was recrystallized from chloroform to give 250 parts of acrylamide having a melting point of 83° C. Removal of the chloroform from the mother liquor by evaporation under reduced pressure gave 73 parts of a mixture of which 38 parts was methoxypropionamide, the remainder acrylamide. The over-all yield of acrylamide was 69 per cent, and the efficiency 74 per cent.

Example 2

A mixture of 650 parts of beta-methoxypropionamide, 325 parts of methanol and 2 parts of N-phenyl-beta-naphthylamine was passed over lithium phosphate as catalyst maintained at a temperature of 300° C. The reactor and the rate of feed of the liquid to the preheater was the same as described in Example 1. The product was condensed, collected and inhibited from polymerization also as described in Example 1.

On distillation, the condensate was found to contain 83 parts of acrylamide, 344 parts of methanol and 24 parts of unconverted beta-methoxypropionamide. The yield of acrylamide was 20 per cent of theory and the efficiency was 67 per cent.

Example 3

Using substantially the same reactor and procedure as described in Example 1, a mixture of beta-methoxyisobutyramide (368 parts), methanol (138 parts) and N-phenyl-beta-naphthylamine (0.5 part) was passed over lithium phosphate at a rate of 260 milliliters per hour of liquid fed to the preheater. The lithium catalyst bed was maintained at a temperature of 350° C. throughout the run. The product of the reaction was collected by condensation, inhibited against polymerization, and distilled under reduced pressure using a fractionating column as before. The fractions boiling above 80° C. at a pressure of 10 millimeters of mercury were composited and recrystallized from chloroform to give methacrylamide having a melting point of 109° C. The yield was 48 per cent of theory and the efficiency 53 per cent.

Example 4

A mixture of 100 parts of beta-methoxypropionamide, 50 parts of methanol and 0.3 part of N-phenyl-beta-naphthylamine was passed over titania as catalyst, maintained at a temperature of 300° C. The catalyst which was in the form of ⅜ inch pellets prepared from titania of pigment grade, had a total volume of 300 milliliters and was contained in a converter which was a stainless steel tube of 1 inch inside diameter. The inlet end of the converter tube was packed with 100 milliliters of catalytically inert silica to serve as a preheater and vaporizer for the mixture.

The mixture was fed into the preheater and vaporizer at a rate of 200 milliliters per hour. The reaction products from the converter were collected by cooling and condensation, and inhibited against polymerization by the addition of 0.3 part of di-beta-naphthyl-para-phenylenediamine. The condensate was then distilled using a two foot unpacked column for rectification. Methanol was removed at atmospheric pressure, and the pressure then reduced to 3 millimeters of mercury. At this reduced pressure, the acrylamide distilled at a head temperature of 93° C. The fractions distilling above 93° C. were combined and recrystallized from chloroform to give 171 parts of colorless acrylamide. The removal of the chloroform from the mother liquor gave 100 parts of a mixture containing 48 per cent of acrylamide, the remainder methoxypropionamide. The overall yield of acrylamide was 218 parts, corresponding to 60 per cent of theory. The chemical efficiency was 66 per cent.

The embodiment of the invention where the de-alcoholation is carried out over lithium phosphate is claimed in our copending application filed August 1, 1949, Serial No. 108,047.

What is claimed is:

1. A vapor phase process for making an acrylamide which comprises passing a beta-(lower alkoxy) propionamide of the formula $$ROCH_2CHR^1CONH_2$$

in which R is a lower alkyl group and $R^1$ is of the group consisting of hydrogen and a lower alkyl group over titania as a catalyst maintained at a temperature of 225° to 400° C.

2. A vapor phase process for making acrylamide which comprises passing beta-methoxypropionamide of the formula $$CH_3OCH_2CH_2CONH_2$$

over titania as catalyst maintained at a temperature between 225° C. and 400° C.

3. A vapor phase process for making acrylamide which comprises passing beta-ethoxypropionamide of the formula $C_2H_5OCH_2CH_2CONH_2$ over titania as catalyst maintained at a temperature between 225° C. and 400° C.

4. A vapor phase process for making an acrylamide which comprises passing a beta-methoxypropionamide of the formula $$CH_3OCH_2CHR^1CONH_2$$

in which $R^1$ is a lower alkyl group over titania as catalyst maintained at a temperature between 225° C. and 400° C.

5. A vapor phase process for making an acrylamide which comprises passing a beta-ethoxy-propionamide of the formula

C₂H₅OCH₂CHR¹CONH₂ in which R¹ is a lower alkyl group over titania as catalyst maintained at a temperature between 225° C. and 400° C.

6. A vapor phase process for making an acrylamide which comprises passing a beta-propoxy-propionamide of the formula

C₃H₇OCH₂CHR¹CONH₂ in which R¹ is a lower alkyl group over titania as catalyst maintained at a temperature between 225° C. and 400° C.

7. A vapor phase process for making acrylamide which comprises passing beta-alkoxypropionamide wherein the alkoxy group contains not more than four carbon atoms over titania as a catalyst maintained at a temperature of 225° to 400° C.

8. A vapor phase process for making acrylamide which comprises passing beta-alkoxypropionamide wherein the alkoxy group contains not more than four carbon atoms over titania as a catalyst maintained at a temperature of 250° to 350° C.

9. A vapor phase process for making methacrylamide which comprises passing beta-alkoxyisobutyramide wherein the alkoxy group contains not more than four carbon atoms over titania as a catalyst maintained at a temperature of 225° to 400° C.

10. A vapor phase process for making methacrylamide which comprises passing beta-alkoxyisobutyramide wherein the alkoxy group contains not more than four carbon atoms over titania as a catalyst maintained at a temperature of 250° to 350° C.

BENJAMIN PHILLIPS.
PAUL S. STARCHER.

REFERENCES CITED

The following references are of record in the file of this patent:

UNITED STATES PATENTS

| Number | Name | Date |
|---|---|---|
| 2,375,005 | Kung | May 1, 1945 |
| 2,393,000 | Seeger | Jan. 15, 1946 |
| 2,534,585 | Erickson | Dec. 19, 1950 |